3,092,644
PROCESS FOR THE PRODUCTION OF 2-LOWER ALKYL-17β-ACYLOXY-1,4-ANDROSTADIENES
Raymond O. Clinton, East Greenbush, N.Y., assignor to Sterling Drug Inc., New York, N.Y., a corporation of Delaware
No Drawing. Filed Apr. 27, 1959, Ser. No. 808,922
3 Claims. (Cl. 260—397.4)

This invention relates to 2-lower-alkyl-17β-acyloxy-1,4-androstadienes and to the preparation thereof.

The compounds of the invention have the following general formula:

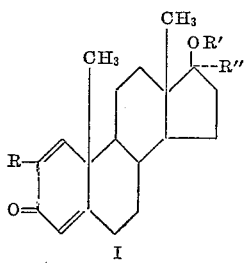

I wherein R represents a lower-alkyl radical, R' represents a carboxylic acyl radical, and R" represents hydrogen or a lower-alkyl radical.

In the above general Formula I, when R and R" represent lower-alkyl radicals they stand for lower-alkyl radicals having from one to about four carbon atoms, thus including such radicals as methyl, ethyl, propyl, isopropyl, butyl, and the like.

In the above general Formula I, R' represents a carboxylic acyl radical preferably derived from carboxylic acids having from one to about ten carbon atoms, conventionally employed in the steroid art, and having a molecular weight less than about 250. Representative of the acyl radicals which can be present are alkanoyl radicals, e.g., formyl, acetyl, propionyl, butyryl, isobutyryl, caproyl, heptanoyl, octanoyl, trimethylacetyl, and the like; carboxy-lower-alkanoyl radicals, e.g., succinyl (β-carboxypropionyl); cycloalkyl-lower-alkanoyl radicals, e.g., β-cyclopentylpropionyl, β-cyclohexylpropionyl, and the like; monocarbocyclic aroyl radicals, e.g., benzoyl, p-toluyl, p-nitrobenzoyl, 3,4,5-trimethoxybenzoyl, and the like; monocarbocyclic aryl-lower-alkanoyl or -alkenoyl radicals, such as phenylacetyl, β-phenylpropionyl, cinnamoyl, and the like; and monocarbocyclic aryloxy-lower-alkanoyl radicals, such as p-chlorophenoxyacetyl, and the like.

The compounds of the invention are prepared from the corresponding compounds having only a single double bond in the 4,5-position of the formula

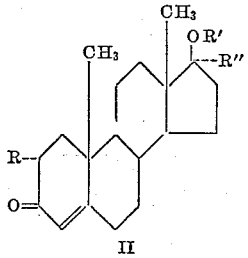

II wherein R, R' and R" have the same meanings given above. The compounds of Formula II are halogenated by reacting with elementary bromine or with an N-bromo-amide or -imide to introduce a bromine atom into the 2-position, followed by heating with a dehydrohalogenating agent to introduce a double bond in the 1,2-position, thus producing the compounds of Formula I.

A preferred bromination procedure comprises heating a compound of Formula II with at least one molar equivalent of an N-bromoamide or N-bromoimide, e.g., N-bromoacetamide, N-bromophthalimide or N-bromosuccinimide, in an inert solvent.

Isolation and purification of the 2-bromo derivative is not necessary, and dehydrohalogenation is carried out by heating the 2-bromo derivative with a non-volatile, liquid organic base, e.g., lutidine or collidine, or other dehydrohalogenating agent, e.g., lithium chloride in dimethylformamide.

The intermediates of Formula II are in turn prepared from testosterone and its 17-lower-alkyl derivatives, or esters thereof, by reacting the latter with a lower-alkyl oxalate or lower-alkyl formate in the presence of a strong base under anhydrous conditions to introduce a lower-alkoxyoxalyl or formyl radical, respectively, in the 2-position. The 2-acyl derivative, without isolation, is then alkylated with the appropriate alkyl halide in the same reaction medium. The resulting 2-acyl-2-lower-alkyl-testosterone derivative is finally heated with a strong base in lower-alkanol or aqueous-lower-alkanol medium which reverses the original acylation reaction, cleaving the 2-lower-alkoxyoxalyl or formyl radical and producing a compound of Formula II.

Endocrinological evaluation has demonstrated that the compounds of the invention of Formula I above possess pituitary inhibiting properties as measured by the manifest endocrine imbalance brought about by decrease in the pituitary secretion of the follicle-stimulating and interstitial cell-stimulating hormones. Pituitary inhibiting agents are useful in the treatment of endocrinological disorders such as menopausal syndrome, endometriosis, postpartum breast engorgement, benign prostatic hypertrophy, functional uterine bleeding, chronic cystic mastitis, and suppression or termination of reproduction processes.

The compounds of the invention can be prepared for use by dispersing them in an aqueous suspension or by dissolving them in a pharmacologically acceptable oil or oil-water emulsion for parenteral administration; or by incorporation in tablet form with excipients for oral administration.

The structure of the compounds of the invention was established by the mode of synthesis, elementary analysis, and ultraviolet, infrared and nuclear magnetic resonance spectra.

The following examples will further illustrate the invention without the latter being limited thereby.

Example 1

(a) 2-methyl-17β-hydroxy-4-androsten-3-one.—A solution of 10.0 g. (0.035 mole) of testosterone (dried at 50° C. for six hours over potassium hydroxide in vacuo) in 20 ml. of tertiary-butyl alcohol was added dropwise to a solution of potassium tertiary-butoxide prepared from 1.37 g. (0.035 mole) of potassium and 80 ml. of tertiary-butyl alcohol. There was then added, also dropwise, 5.58 g. (0.038 mole) of ethyl oxalate in 20 ml. of tertiary-butyl alcohol. This mixture was stirred for three hours at 75° C., and then 9.86 g. of methyl iodide in 20 ml. of tertiary-butyl alcohol was added. The reaction mixture was stirred for one hour at 70° C., allowed to stand at room temperature for about fifteen hours, and then diluted with water and extracted with a benzene-ether mixture. The organic extracts were washed with water, dried over anhydrous sodium sulfate and concentrated in vacuo. The residue was dried in vacuo over concentrated sulfuric acid for eighteen hours and then dissolved in 120 ml. of tertiary-butyl alcohol and added dropwise to a stirred solution of potassium tertiary-butoxide prepared from 1.3 g. of potassium and 50 ml. of tertiary-butyl alcohol. The latter mixture was stirred at 70° C. for one hour, cooled, diluted with water, 10 ml. of 5% potassium hydroxide solution added, and the mixture extracted with ether. The ether extracts were dried and concentrated in vacuo, and the residue was dissolved in a benzene-pentane (4:1) mixture and chromatographed on a column of 240 g. of neutral alumina. The column was eluted with the solvent series, pentane, benzene, ether, methanol. The desired product was eluted with ether-methanol (99:1) and recrystallized first from ether and then from an acetone-ether mixture to give 2α-methyl - 17β - hydroxy - 4 - androsten - 3 - one in the form of colorless prisms, M.P. 154.6–156.6° C. (corr.), $[\alpha]_D^{24} = +123.7°$ (1% in chloroform); ultraviolet maximum at 240 mμ (E=15,400).

Analysis.—Calcd. for $C_{20}H_{30}O_2$: C, 79.42; H, 10.00. Found: C, 79.26; H, 9.60.

(b) *2α-methyl-17β-propionoxy-4-androsten-3-one.*—A mixture of 2.0 g. of 2α-methyl-17β-hydroxy-4-androsten-3-one, 1.73 g. of propionic anhydride and 20 ml. of pyridine was protected from moisture and kept at room temperature for about three days. The reaction mixture was diluted with ether, washed successively with 5% sodium carbonate solution, 5% hydrochloric acid and water, and then concentrated in vacuo. The residue was dissolved in ether and filtered through 80 g. of activated, non-alkaline alumina to give 1.41 g. of 2α-methyl-17β-propionoxy-4-androsten-3-one, which when recrystallized from ether and dried at 70° C. for twenty-four hours was obtained in the form of colorless prisms, M.P. 119.0–135.4° C. (corr.), $[\alpha]_D^{24} = +99.2°$ (1% in chloroform); ultraviolet maximum at 239 mμ (E=15,900).

Analysis.—Calcd. for $C_{23}H_{34}O_3$: C, 77.05; H, 9.56. Found: C, 77.09; H, 9.36.

(c) *2-methyl-17β-propionoxy-1,4-androstadien-3-one.*— 2α - methyl - 17β - propionoxy - 4 - androsten - 3 - one (9.00 g.) was dissolved in 120 ml. of carbon tetrachloride, 20 ml. of solvent was removed by distillation, and 4.47 g. of N-bromosuccinimide was then added. The reaction mixture was refluxed for two hours, cooled, filtered, and the filtrate concentrated in vacuo at 50° C. The residue was dissolved in 100 ml. of equal parts of 2,4-lutidine and γ-collidine, and the mixture was refluxed for one-half hour and kept at room temperature for about three days. The mixture was then poured into a mixture of 150 g. of ice and 20 ml. of concentrated sulfuric acid and extracted with methylene dichloride. The methylene dichloride extracts were washed with 5% sodium carbonate solution and water, dried and concentrated. The residue was dissolved in a benzene-pentane (1:1) mixture and chromatographed on 400 g. of silica gel. The column was eluted with the solvent series, pentane, benzene, ether. The desired product was eluted with benzene-ether (10:1), giving 8.13 g. of crystals which were rechromatographed on 300 g. of silica gel and eluted with benzene-ether (49:1). The later fractions were combined and recrystallized three times from ether to give 2-methyl-17β-propionoxy-1,4-androstadien-3-one in the form of colorless needles, M.P. 142.2–145.2° C. (corr.), $$[\alpha]_D^{25} = +19.9°$$

(1% in chloroform); ultraviolet maximum at 248 mμ (E=15,200); infrared maxima at 5.79, 6.03, 6.15, 8.40 and 11.35μ. The structure was further confirmed by comparison of the nuclear magnetic resonance spectrum with that of 1,4-chloestadien-3-one.

Analysis.—Calcd. for $C_{23}H_{32}O_3$: C, 77.49; H, 9.05. Found: C, 77.22; H, 8.86.

2 - methyl - 17β - propionoxy - 1,4-androstadien-3-one showed evidence of pituitary inhibition at a dose level of 10.0 milligrams per kilogram per day as measured by the altered endocrine balance in mature female rats.

Example 2

2-ethyl-17β-propionoxy-1,4-androstadien-3-one can be prepared by repeating the manipulative procedure described above in Example 1 but replacing the methyl iodide in part (a) by a molar equivalent amount of ethyl iodide.

Example 3

2 - propyl - 17β - propionoxy - 1,4 - androstadien - 3-one can be prepared by repeating the manipulative procedure described above in Example 1 but replacing the methyl iodide in part (a) by a molar equivalent amount of propyl bromide.

Example 4

2 - isopropyl - 17β - propionoxy - 1,4 - androstadien-3-one can be prepared by repeating the manipulative procedure described above in Example 1 but replacing the methyl iodide in part (a) by a molar equivalent amount of isopropyl bromide.

Example 5

2 - butyl - 17β - propionoxy - 1,4 - androstadien - 3-one can be prepared by repeating the manipulative procedure described above in Example 1 but replacing the methyl iodide in part (a) by a molar equivalent amount of butyl bromide.

Example 6

2 - methyl - 17β - acetoxy - 1,4 - androstadien - 3 -one can be prepared by repeating the manipulative procedure described above in Example 1 but replacing the propionic anhydride in part (b) by a molar equivalent amount of acetic anhydride.

Example 7

2 - methyl - 17β - caproyloxy - 1,4 - androstadien - 3-one can be prepared by repeating the manipulative procedure described above in Example 1 but replacing the propionic anhydride in part (b) by a molar equivalent amount of caproic anhydride.

Example 8

2 - methyl - 17β - benzoyloxy - 1,4 - androstadien - 3-one can be prepared by repeating the manipulative procedure described above in Example 1 but replacing the propionic anhydride in part (b) by a molar equivalent amount of benzoyl chloride.

Example 9

2-methyl - 17β - (β - carboxypropionoxy) - 1,4 - androstadien-3-one can be prepared by repeating the manipulative procedure described above in Example 1 but replacing the propionic anhydride in part (b) by a molar equivalent amount of succinic anhydride.

Example 10

2-methyl-17β-phenylacetyl-1,4-androstadien-3-one can be prepared by repeating the manipulative procedure described above in Example 1 but replacing the propionic anhydride in part (b) by a molar equivalent amount of phenylacetyl chloride.

Example 11

2 - methyl - 17β - (β - cyclopentylpropionoxy - 1,4-androstadien-3-one can be prepared by repeating the manipulative procedure described above in Example 1 but replacing the propionic anhydride in part (b) by a molar equivalent amount of β-cyclopentylpropionyl chloride.

Example 12

2 - methyl - 17β - trimethylacetoxy - 1,4 - androstadien-3-one can be prepared by repeating the manipulative procedure described above in Example 1 but replacing the propionic anhydride in part (b) by a molar equivalent amount of trimethylacetyl chloride.

Example 13

2 - methyl - 17β - cinnamoyloxy - 1,4 - androstadien-3-one can be prepared by repeating the manipulative procedure described above in Example 1 but replacing the propionic anhydride in part (b) by a molar equivalent amount of cinnamoyl chloride.

*Example 14*

2 - methyl - 17β - phenoxyacetoxy - 1,4 - androstadien-3-one can be prepared by repeating the manipulative procedure described above in Example 1 but replacing the propionic anhydride in part (b) by a molar equivalent amount of phenoxyacetic anhydride.

*Example 15*

2,17α - dimethyl - 17β - propionoxy - 1,4 - androstadien-3-one can be prepared by repeating the manipulative procedure described above in Example 1 but replacing the testosterone in part (a) by a molar equivalent amount of 17α-methyl-17β-hydroxy-4-androsten-3-one. In this instance the esterification step corresponding to part (b) of Example 1 is carried out by refluxing the reactants for four to six hours instead of at room temperature.

*Example 16*

2 - methyl - 17α - ethyl - 17β - propionoxy-1,4-androstadien-3-one can be prepared by repeating the manipulative procedure described above in Example 1 but replacing the testosterone in part (a) by a molar equivalent amount of 17α-ethyl-17β-hydroxy-4-androsten-3-one. In this instance the esterification step corresponding to part (b) of Example 1 is carried out by refluxing the reactants for four to six hours instead of at room temperature.

I claim:

1. The process for preparing a compound having the formula

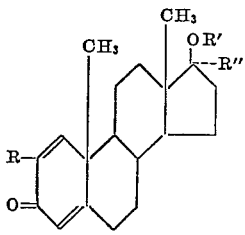

wherein R represents a lower-alkyl radical, R' represents a carboxylic acyl radical, and R'' represents a member of the group consisting of hydrogen and lower-alkyl radicals, which comprises brominating a compound having the formula

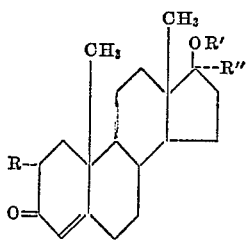

and heating the resulting 2-bromo compound with a dehydrohalogenating agent.

2. The process for preparing a compound having the formula

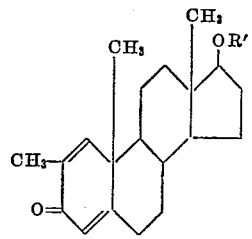

wherein R' represents a lower-alkanoyl radical, which comprises brominating a compound having the formula

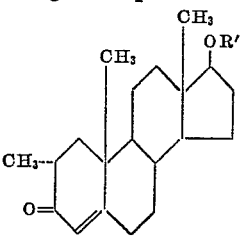

and heating the resulting 2-bromo compound with a dehydrohalogenating agent.

3. The process for preparing 2-methyl-17β-propionoxy-1,4-androstadien-3-one which comprises reacting 2α-methyl-17β-propionoxy-4-androsten-3-one with N-bromosuccinimide and heating the resulting 2-bromo compound with a non-volatile, liquid organic amine.

References Cited in the file of this patent

UNITED STATES PATENTS

| 2,837,464 | Nobile | June 3, 1958 |
| 2,854,465 | Wettstein et al. | Sept. 30, 1958 |
| 2,933,509 | Chemerda et al. | Apr. 19, 1960 |

OTHER REFERENCES

Ringold et al.: "Journal of American Chemical Society" (1959), vol. 81, pages 427 to 431.